(12) United States Patent
Igata et al.

(10) Patent No.: US 7,392,468 B2
(45) Date of Patent: Jun. 24, 2008

(54) DOCUMENT DELIVERY DEVICE, DOCUMENT RECEIVING DEVICE, DOCUMENT DELIVERY METHOD, DOCUMENT DELIVERY PROGRAM, AND DOCUMENT DELIVERY SYSTEM

(75) Inventors: Nobuyuki Igata, Kawasaki (JP); Fumihiko Kozakura, Kawasaki (JP); Yoshio Nakao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 10/912,363

(22) Filed: Aug. 6, 2004

(65) Prior Publication Data

US 2005/0010867 A1 Jan. 13, 2005

Related U.S. Application Data

(63) Continuation of application No. PCT/JP02/01077, filed on Feb. 8, 2002.

(51) Int. Cl.
*G06F 17/00* (2006.01)

(52) U.S. Cl. .................. 715/203; 715/234; 715/236; 715/239; 707/3; 707/4; 707/6

(58) Field of Classification Search .............. 715/501.1, 715/511, 513, 517, 530, 203, 229, 234, 236, 715/239, 242, 243, 255; 709/203, 219; 707/1–6
See application file for complete search history.

(56) References Cited

U.S. PATENT DOCUMENTS

| | | | |
|---|---|---|---|
| 6,356,903 B1 * | 3/2002 | Baxter et al. ................. 707/10 |
| 6,424,979 B1 * | 7/2002 | Livingston et al. ........... 715/511 |
| 6,742,054 B1 * | 5/2004 | Upton, IV ........................ 710/6 |
| 6,917,937 B1 * | 7/2005 | Rubendall ........................ 707/5 |
| 7,174,327 B2 * | 2/2007 | Chau et al. ....................... 707/3 |
| 2002/0116415 A1 * | 8/2002 | Dutta et al. ................... 707/516 |
| 2002/0143816 A1 * | 10/2002 | Geiger et al. ................. 707/513 |
| 2002/0143821 A1 * | 10/2002 | Jakubowski ................. 707/522 |
| 2003/0101169 A1 * | 5/2003 | Bhatt et al. ...................... 707/3 |

FOREIGN PATENT DOCUMENTS

| | | |
|---|---|---|
| EP | 1128280 A2 * | 8/2001 |
| EP | 1 143 348 A2 | 10/2001 |
| JP | 10-269160 | 10/1998 |
| JP | 2000-259640 | 9/2000 |
| JP | 2001-24996 | 1/2001 |
| JP | 2001-236261 | 8/2001 |

OTHER PUBLICATIONS

International Search Report for corresponding PCT application PCT/JP02/01077.
International Preliminary Examination Report for corresponding PCT application PCT/JP02/01077.
Communication from the Japanese Patent Office dated Sep. 25, 2007.

* cited by examiner

*Primary Examiner*—Doug Hutton
*Assistant Examiner*—James H Blackwell
(74) *Attorney, Agent, or Firm*—Staas & Halsey LLP

(57) ABSTRACT

Based on reference information of a structured-document application program, structure information and contents of a structured document to be delivered are specified separately. Based on the specification, the structure information and the contents are obtained from a database which stores the structured document, to generate the structured document to be delivered. The generated structured document is delivered to the structured-document application program.

14 Claims, 19 Drawing Sheets

| | Collation condition | | | Output instruction | |
|---|---|---|---|---|---|
| | Upper-level condition | Basing-point element | Lower-level condition | | |
| Structure information | body// | key | — | ○ | Command 1 |
| Contents | — | body | — | ○ | Command 2 |

FIG. 3

```
<article>
<header>
 <title>○○○、Success in developing a structured-document processing device</title>
 <date> month :XX date:YY, year:ZZZZ</date>
 <photo> none</photo>
 5
</header>
<body>
<p><key>○○○ co. ltd. </key>announced on <date>date:YY month:XX </date>,
<key>XML </key> <key>structured-document </key><feature>automatic processing
</feature><key>AAA device</key> was successfully developed.</p>
<p><key>AAA device </key>does ···</p>
...
</body>
<writer>○○ structure</writer>
</article>
```

FIG. 4

```
<article>
<body>
<p><key>○○○ co. ltd. </key>announced on date:YY month:XX, <key>XML </key>
<key>structured-document </key>automatic processing <key>AAA device</key>
was successfully developed.</p>
<p><key>AAA device </key>does ···</p>
...
</body>
</article>
```

|  | Collation condition | | | Output instruction | |
|---|---|---|---|---|---|
|  | Upper-level condition | Basing-point element | Lower-level condition | | |
| Structure information | body// | key | — | ○ | — Command 1 |
| Contents | — | article | — | ○ | — Command 2 |
|  | article/ | body | — | × | — Command 3 |
|  | body// | key | — | ○ | — Command 4 |

FIG. 7

```
<article>
  ○○○, Success in developing a structured-document processing device
  month:XX date:YY, year:ZZZZ
  none
  5
<body>
<p>
  <key> ○○○ co. ltd. </key>
  <key>XML</key>
  <key> structured-document </key>
  <key>AAA device</key>
</p>
<p>
  <key>AAA device </key>…
</p>
…
</body>
  ○○structure
</article>
```

FIG. 8

```
<!DOCTYPE article [
  <!ELEMENT article  (header, body, writer?)>
  <!ELEMENT header   (titile, date?, photo?, page?)>
  <!ELEMENT title    (#PCDATA)>
  …
  <!ELEMENT body     (#PCDATA | p)*>
  <!ELEMENT p        (#PCDATA | key | date | feature)*>
  <!ELEMENT key      (#PCDATA)>
  …
]>
```

FIG. 9

```
<article>
<header><title/></header>    ← Added structure information
<body>
<p><key>○○○ co. ltd. </key>announced on date:YY month:XX, <key>XML </key>
<key>structured-document </key>automatic processing <key>AAA device</key> was
successfully developed.</p>
<p><key>AAA device </key>does …</p>
…
</body>
</article>
```

| | Collation condition | | | Output instruction | |
|---|---|---|---|---|---|
| | Upper-level condition | Basing-point element | Lower-level condition | | |
| Structure information | body// | key | — | ○ | ← Command 1 |
| Contents | — | article | — | 2 | ← Command 2 |
| | article/ | body | — | X | ← Command 3 |
| | body// | key | — | 1 | ← Command 4 |

FIG.14

```
<xsl:stylesheet version= "1.0"
    xmlns:xsl= "http://www.OOO.XXX/1999/XSL>

<xsl:template match= "product">
    <table>
      < xsl:apply-templates select= "name"/>
    </table>
    <table>
      < xsl:apply-templates select= ".//domestic"/>
    </table>
    </xsl:template>

</xsl:stylesheet>
```

FIG.15

| | Collation condition | | | Output instruction | |
|---|---|---|---|---|---|
| | Upper-level condition | Basing-point element | Lower-level condition | | |
| Structure information | — | product | — | ○ | Command 1 |
| | product/ | name | — | ○ | Command 2 |
| | product// | domestic | — | ○ | Command 3 |
| Contents | / | * | — | ○ | Command 4 |
| | — | product | — | × | Command 5 |
| | product/ | name | — | ○ | Command 6 |
| | product// | domestic | — | ○ | Command 7 |

FIG.17

```
<products>
 <product>
  <name>AAA</name>
  <sales>
    <domestic>$100,000</domestic>
    <foreign> $ 10,000</<foreign>
  </sales>
  <catalog>AAA.catalog</catalog>
  <argent>AAA.argent</argent >
  ...
 </product>
 <product>
  <name>BBB</name>
  <sales>
    <domestic>$200,000</domestic>
    <foreign>$20,000 </foreign>
  </sales>
  <catalog>BBB.catalog</catalog>
  <argent>BBB.argent</argent >
  ...
 </product>
 ...
</products>
```

```
<products>
 <product>
  <name>AAA</name>
  <sales>
   <domestic>$100,000</domestic>
  </sales>
 </product>
 <product>
  <name>BBB</name>
  <sales>
   <domestic>$200,000</domestic>
  </sales>
 </product>
 ...
</products>
```

FIG.21

```
<!DOCTYPE products>[
  <!ELEMENT products  (product*)>
  <!ELEMENT product   (name,sales?,catalog?,argent?,...)>
  <!ELEMENT name      (#PCDATA)>
  <!ELEMENT sales     (domestic,foreign)>
  ...
]>
```

FIG.22

```
<products>
 <product>
  <name>AAA</name>
  <sales>
   <domestic>$100,000</domestic>
   <foreign/>
  </sales>
 </product>
 <product>
  <name>BBB</name>
  <sales>
   <domestic>$200,000</domestic>
   <foreign/>
  </sales>
 </product>
 ...
</products>
```

| | Collation condition | | | Output instruction | |
|---|---|---|---|---|---|
| | Upper-level condition | Basing-point element | Lower-level condition | | |
| Structure information | body// | key | @level="3" | ○ | — Command 1 |
| Contents | — | article | — | ○ | — Command 2 |
| | article/ | body | — | × | — Command 3 |
| | body// | key | — | ○ | — Command 4 |

FIG.25

```
<article>
<header>
 <title>○○○、Success in developing a structured-document processing device</title>
 <date> month:XX date:YY, year:ZZZZ</date>
 <photo> none</photo>
 5
</header>
<body>
<p><key level = "3" >○○○ co. ltd. </key>announced on <date>date:YY month:XX
</date>, <key level = "3" >XML </key> <key level = "1" >structured document </key>
<feature>automatic processing </feature><key level ="2" >AAA device</key> was
successfully developed.</p>
<p><key level = "2" > AAA device </key>does ···</p>
...
</body>
<writer>○○ structure</writer>
</article>
```

FIG.26

```
<article>
 ○○○、Success in developing a structured-document processing device
 month:XX date:YY, year:ZZZZ
 none
  5
<body>
<p>
 <key> ○○○ co. ltd. </key>
 <key>XML </key>
 structured document
 AAA device
</p>
<p>
 AAA device
 ...
</p>
 ...
</body>
 ○○ structure
</article>
```

FIG.28

| | Collation condition | | | Output instruction | |
|---|---|---|---|---|---|
| | Upper-level condition | Basing-point element | Lower-level condition | | |
| Structure information | — | product | — | ○ | — Command 1 |
| | product/ | name | — | ○ | — Command 2 |
| | product// | domestic | — | ○ | — Command 3 |
| Contents | / | * | — | 3 | — Command 4 |
| | — | product | — | × | — Command 5 |
| | product/ | name | — | 1 | — Command 6 |
| | product// | domestic | — | 2 | — Command 7 |

DOCUMENT DELIVERY DEVICE, DOCUMENT RECEIVING DEVICE, DOCUMENT DELIVERY METHOD, DOCUMENT DELIVERY PROGRAM, AND DOCUMENT DELIVERY SYSTEM

This application is a continuing application, filed under 35 U.S.C. §111(a), of International Application PCT/JP02/01077, filed Feb. 8, 2002.

TECHNICAL FIELD

The present invention relates to a document delivery device, a document delivery method, and a document delivery program for delivering a document (hereinafter referred to as a structured document) added with information concerning the structure of the document, to an application program (hereinafter referred to as a structured-document application program) which executes a predetermined processing on the structured document, and a document receiving device which receives the delivered structured document. In particular, the present invention relates to a document delivery device, a document delivery method, a document delivery program, and a document delivery system which are capable of delivery with reduced unnecesary information, and a document receiving device which receives the delivered structured document.

BACKGROUND ART

In recent years, use of a structured-document format called XML (extensible Markup Language 1.0, W3C Recommendation, 10, Feb. 1998) has been rapidly spreading in the fields of EC (Electronic Commerce) and B2B (Business to Business). XML is a data format expressing a hierarchical document structure by tags. With use of XML, annotation information such as the logical structure of a document, the types of stored data, and the like can be embedded in the document, separately from the body of data. This kind of document can be converted into a processible format easily by a calculator and allows various related information to be managed together. Unified management can hence be easier.

In some aspects, however, there are demerits from the viewpoints of individual application programs. That is, even those application programs that require only specific types of data have to exclude unnecessary data while processing data. Therefore, extra time and costs are demanded.

In general, an application program (XML application program) which handles an XML document converts the XML document into a data model such as DOM (Document Object Model Level 1, W3C Recommendation 1, Oct. 1998) by randomly accessing respective elements of the document, and then processes the document. DOM is a standard of an object-oriented data model which has a general-purpose interface designed supposing access from various XML application programs. If an XML document is developed on a main memory with use of a data model like DOM, calculation resources (calculation time, necessary memory) which are necessary for converting an XML document of a text format into the data model like DOM, increase as the document size increases. This has been a problem.

In case of handling a large amount of structured documents of XML or the like, a database is used as a storage of the structured documents. There are well-known systems of storing documents into a database, e.g., a system of mapping documents on RDB (Relational Database), a system of handling elements of a structured document as objects and storing the elements into ODB (Object Database), etc. When a structured-document application program processes a document in these systems, however, an original structured-document is regenerated from information stored in a database and then delivered to the structured-document application program. The documents to be treated therefore have large sizes. As the documents are more complicated, costs for picking up and delivering the documents increase.

Further, there is a case that the processing in the structured-document application program requires only a part of a document. For example, an ordinary search system needs to pick up only the titles of documents which satisfy search conditions and to output the titles in a search list. Unless the user requests access to the entire of a document, the entire part of the document is not required.

To solve these problems, compressed structured-documents are delivered according to a conventional technique. For example, "Proposals for XML data compression method based on element name compression: Simplified Element XML" (by Shouhei Yokoyama, Manabu Ohta, and Hiroshi Ishikawa), and "IPSJDBS/ACM SIGMOD Japan Chapter/JSPS-RFTF AMCP Joint Symposium concerning Database and Web Information System: pp. 331-337" (December 2000) disclose a technique of reducing delivery costs for XML documents by compressing tag information. Japanese Patent Laid-Open No. 2001-236261 discloses a technique in which a means for extracting partial elements of XML documents is provided in the data server side, only those partial elements requested from a structured-document application program are delivered, and a cache mechanism for partial elements is provided in the client side where the structured-document application program operates, to reduce delivery costs for XML documents.

However, it is impossible to save calculation resources used by a structured-document application program although delivery costs for structured-documents can be reduced with only the delivery of compressed structured-documents. According to the Japanese patent Laid-Open No. 2001-236261, partial elements are extracted and delivered without distinguishing structure information from contents. Therefore, contents are extracted even with respect to those parts that are referred to by a structured-document application program. As a result, the delivery costs cannot be reduced sufficiently. These methods do not take into consideration restriction information concerning the document structure represented by the document type definition (DTD) in XML documents. It is hence possible that a document of a type which cannot be processed by a structured-document application program may be delivered. For example, in some cases, a structured-document application program of a type which verifies the document structure with use of DTD fails to verify a delivered document and cannot thereafter continue subsequent processing.

The present invention has been made to solve these problems, and has an object of providing a document delivery device, a document delivery method, a document delivery program, and a document delivery system, which are capable of reducing costs for delivery to structured-document application programs by extracting and delivering only information necessary for the structured-document application programs, and capable of calculation resources used by the structured-document application programs, and a document receiving device which receives delivered structured-documents.

DISCLOSURE OF THE INVENTION

According to an aspect of the present invention, a document delivery device which delivers a structured document necessary for a predetermined processing to an application program which executes the predetermined processing on the structured document is characterized by comprising: a reception means for receiving a delivery request from the application program; a specification means for separately specifying structure information and contents of a structured document to be delivered, based on the delivery request received by the reception means; a generation means for obtaining the structure information or the contents from a predetermined storage unit and generating the structured document to be delivered, based on specification from the specification means; and a delivery means for delivering the structured document generated by the generation means to the application program.

According to the constitution described above, necessary elements in a document can be extracted and delivered separating structure information from contents. For example, with respect to such a part of a document in which an application program refers only to structure information, only the structure information can be delivered omitting the contents. Accordingly, it is possible to greatly reduce data delivery costs and the calculation resources used by the application program without limiting functions of the application program.

The structured document described above may be a document in the XML format or the like. When delivering an XML document, the delivery request may be constructed in reference information like a style-sheet. Further, in an XML document, structure information is constituted by tags or properties, and contents are constituted by text data or attribute values which are marked up with tags. Further, the predetermined storage unit corresponds to the database in the embodiments 1 and 3 described later.

The document delivery device according to the present invention may further be characterized in that the specification of the structure information made by the specification means is carried out by writing at least types of elements constituting the structured document, appearance environments of the elements, or conditions concerning the contents of the elements. Further, the device may be characterized in that the specification of the contents made by the specification means is carried out by writing at least types of elements constituting the structured document, appearance environments of the elements, or conditions concerning the contents of the elements.

According to this constitution, specification conditions concerning the structure information and contents to be delivered by the specification means can be specified only by basic conditions for specifying necessary elements in the structured document. Therefore, it is possible to respond to delivery to various application programs only by specification based on the specification means. In the structured document, the "types of an element" is constituted by a tag name or a attribute name, the "appearance environment of an element" is constituted by an element (upper-level condition) existing in the upper level of each element and an element existing in the lower level of each element (lower-level condition).

Further, the document delivery device according to the present invention may be characterized in that the generation means generates the structured document including a hierarchical structure from elements constituting the structure information specified by the specification means to a root of the document requested by the delivery request.

According to the constitution described above, the generation means can generate a document to be delivered, compensating for elements included in the path from the root element of the document to the element necessary for the application program. Therefore, it is guaranteed that the elements constituting the document to be delivered have the relationships between each other (e.g., the upper-lower relationships and sisterly relationships) which are equivalent to those between the elements in the original document from which the document to be delivered is generated.

The principles of the invention described above will now be described briefly. FIG. 1 is a principle view of the present invention. The document delivery device which delivers structured documents will now be referred to as a structured-document delivery device. An XML document is exemplified as a structured document in the following. The structured-document delivery device 1 shown in FIG. 1 has an output command generation unit 2, a partial structure extraction unit 3, and a partial structure delivery unit 4. The reception means and the specification means described previously correspond to the output command generation unit 2, and the generation means corresponds to the partial structure extraction unit 3, as well as the delivery means to the partial structure delivery unit 4.

The output command generation unit 2 receives reference information (delivery request) 7 from an application program (structured-document application program) which processes structured documents, and analyzes the received reference information. The unit 2 then specifies in form of an output command the structure information and contents of a structured document to be delivered. Specifically, an output command is generated to separately control structure information (tags or properties in XML) which the structured-document application program requires and the contents (text data or attribute values marked up with tags in XML). The partial structure extraction unit 3 reads a structured document (input document) 5a, 5b from a database or the like. In accordance with the output command, the unit 3 extracts the elements and contents which should be outputted, from the input documents, and generates a document (output document) 6a, 6b to be delivered. The partial structure delivery unit 4 delivers efficiently the output document 6a, 6b to the structured-document application program. Both of the input document and the output document may be expressed in either the text format (input document 5a and output document 6a) or the DOM format (input document 5b and output document 6b). This is not particularly limited.

In the flow of the processing, at first, the output command generation unit 2 analyzes the reference information 7 of the structured-document application program and generates an output command including information indicating what elements in a structured document are necessary for the processing by the structured-document application program (structure information) and what contents of elements are necessary.

FIG. 2 shows examples of output commands. The output commands are constituted by two types of output commands, i.e., an output command concerning structure information, and an output command concerning contents. The command 1 is an output command concerning structure information and the command 2 is an output command concerning contents. Each output command is constituted by a collation condition for specifying an element, and an output instruction for specifying output/non-output.

The collation condition is a condition which specifies the type and appearance environment of a basing-point element, in order to specify an element (to be referred to as the basing-point element hereinafter) which is necessary for the structured-document application program. For example, the specification is performed by the tag name of a basing-point element, an upper-level condition concerning the position where the basing-point element appears in a document (condition concerning what kind of tag exists in the upper level of the basing-point element), and a lower-level condition (condition concerning what kind of tag exists in the lower level of the basing-point element). Each of the conditions may include not only tag names and paths (a sequence of tags based on the upper-lower relationship in the hierarchical structure of the document) but also a condition concerning the contents of elements. These conditions can be written in the format of, for example, XPath (XML Path Language 1.0: W3C Recommendation 16, Nov. 1999). The output instruction specifies whether the tag (or attribute) or contents of a basing-point element should be outputted or not. In the example of FIG. 2, "O" means "output". That is, the command 1 is an output command which means that "elements which have appearance positions lower than (in the descendent side of) "body" and whose element type is "key" (structure information) should be outputted". The command 2 is an output command which means that "the contents of elements whose element type is "body" should be outputted".

Subsequently, the partial structure extraction unit 3 reads the input document 5a, 5b, and specifies elements (basing-point elements) in the input document to be outputted (delivered) (which matches the collation condition of the output command), based on the output command generated by the output command generation unit 2. With respect to the structure information, the tags of the basing-point elements are extracted in accordance with the command 1 shown in FIG. 2. In the present invention, elements (tags) positioning on the paths from the basing-point elements to the root are also extracted. As a result, the relationships (the upper-lower relationship and sisterly relationship in the hierarchical structure of the document) between the elements in the output document 6a, 6b become equivalent to those of the original input document 5a, 5b. Therefore, it is possible to output a document suitable for processing made by a structured-document application program.

With respect to the contents, the contents of the basing-point element are extracted in accordance with the command 2. The contents of the basing-point element includes the contents of elements (descendent elements) in the lower levels branched from the basing-point element.

FIG. 3 shows an example of the input document 5a. FIG. 4 shows an example of the output document 6a generated in accordance with the output command of FIG. 2 from the input document shown in FIG. 3. With respect to the part of the output document 6a surrounded by "body" element, only the text data (contents) and "key" tags below the "body" element are outputted while the other tags are not outputted. As tags other than the basing-point element, the "paths from the "root" element to the "key" element ("article" tags and "p" tags in FIG. 3)" are outputted.

The basic principles of the present invention have been described above. Next, with reference to the same structure as shown in FIG. 1, an example will be described in case where a document to be delivered is specified by another output command. FIG. 5 shows examples of output commands including a "non-output" instruction. As shown in FIG. 5, the output command (command 1) concerning structure information is the same as that shown in FIG. 2. However, an output command (command 3) concerning contents includes "x" which means non-output. Thus, according to the present invention, output or non-output can be specified for each of contents, and therefore, unnecesary text data are not delivered.

FIG. 6 is a view showing overlapping between ranges of the output commands concerning contents shown in FIG. 5. As shown in this figure, the influencing ranges of the output commands concerning contents shown in FIG. 5 overlap each other. In this case, however, the contents of lower-level elements take over the output instruction for an upper-level element unless there is no particular output instruction for the contents of the lower-level elements. That is, in FIG. 5, the content of the "header" element takes over the output instruction for the content of the "article" element, and the contents of "p" elements (other than the content of the "key" element) take over the output instruction for the content of the "body" element. An example of an output document generated under these instructions is shown in FIG. 7. The output document shown in FIG. 7 is also an example of an output document generated in accordance with the output command shown in FIG. 5 in regard to the input document shown in FIG. 3. The content of the "key" element below the "body" element and the content of the "article" element other than the "body" element are outputted.

The best mode for carrying out the present invention using the principles of the present invention will be described in detail with reference to the embodiment 1.

Further, the document delivery device according to the present invention may be characterized in that the structured document defines definition information concerning the document structure, and the generation means generates the structured document, based on the definition information in addition to the specification by the specification means.

According to the constitution described above, elements (tags and properties) specified to be essential are added to delivered documents, referring to definition information concerning the document structure upon necessity. It is therefore guaranteed that delivered documents properly match the definition information. In this manner, processible documents can be delivered to application programs of a type which verify structures of structured documents, with use of the definition information concerning document structures.

Brief description will now be made of principles in case of generating an output command based on the definition information concerning the structure of a structured document, with use of the same structure as shown in FIG. 1 described previously. In this description, DTD in XML is used as definition information concerning a document structure. FIG. 8 shows an example of DTD of the input document shown in FIG. 3. With respect to the elements picked up in <!ELEMENT>, elements included in a lower level thereof are defined (in () in the figure). Further, with respect to each element, symbols such as "?", "*", "+", or the like is added or no symbol is added, to define whether the element is omissible (?, *) or is an essential element (+, no symbol). In the figure, there are definitions: the "article" element has a "header" element and a "body" element (essential); the header "element" has a "title" element (essential) and the other elements are omissible; and the "body" element has text data and a "p" element and is omissible".

If DTD of this kind is previously provided, the partial structure extraction unit 3 reads the DTD in addition to output commands when a document to be delivered is created. The unit 3 outputs as structure information the elements defined as essentials by the DTD.

FIG. 9 shows an example of an output document which is generated, based on the output command shown in FIG. 2, referring to the DTD shown in FIG. 8. As shown in this figure, "header" tags and a "title" tag without specifications are outputted in the output command shown in FIG. 2.

The best mode for carrying out the present invention using the principles of the present invention will be described in detail with reference to the embodiment 1.

Further, the document delivery device may be characterized in that the delivery means separates the structured document generated by the generation means into the structure information and the contents, and delivers the structure information and the contents, with a priority given to the structure information. Furthermore, the document delivery device according to the present invention may be characterized in that the delivery means has a determination means for determining a delivery order of the contents of respective elements constituting the structured document generated by the generation means, and delivers the contents of the elements, based on the order determined by the determination means, after delivering the structure information.

Also the document delivery device according to the present invention may be characterized in that the specification means has a delivery order specification means for specifying a delivery order of the contents of respective elements constituting the structured document to be delivered, and the delivery means delivers the structure information and thereafter delivers the contents of the elements constituting the structured document generated by the generation means, based on the order specified by the delivery order specification means.

According to this constitution, the delivery means can deliver firstly the structure information of a document to be delivered, and can subsequently deliver the contents of elements in the order from the higher priority. Therefore, it is possible to reduce the waiting time until delivery to an application program, when a document including a particularly long content is delivered.

The above-mentioned principles of the invention will now be described in brief with reference to the same structure as shown in FIG. 1 described previously. The output document generated by the partial structure extraction unit 3 is converted by the partial structure delivery unit 4 into a format which a structured-document application program can receive, and is then delivered to the structured-document application program. In the present invention, the partial structure delivery unit 4 has a means which delivers the output document, step by step. Therefore, it is possible to deliver only the structure information at first and subsequently deliver contents of elements in the order from the highest priority.

FIG. 10 shows examples of output commands with priorities. In FIG. 10, output instructions of output commands concerning the contents specify priorities in which a smaller numeral expresses a higher priority. FIG. 11 is a view illustrating principles of stepwise delivery processing. In response to the output command shown in FIG. 10, the partial structure delivery unit 4 delivers at first the structure information of an output document (①) in FIG. 11), and subsequently delivers the contents of the "key" element (② in FIG. 11) and then contents other than that of the "key" element (③ in FIG. 11), in accordance with the priority order shown in FIG. 10.

The best mode for carrying out the present invention using the principles of the present invention will be described in detail with reference to the embodiment 3.

According to another aspect of the present invention, there is provided a document receiving device characterized by comprising: a document reception means for receiving a structured document delivered from the document delivery device described above; and an output means for outputting the structured document received by the document reception means, to the application program.

Further, the document receiving device according to the present invention may comprise a synthesis means for synthesizing plural blocks to generate the structured document delivered when the document reception means receives the structured document separated into the plural blocks, and may be characterized in that the output means outputs the structured document synthesized by the synthesis means to the application program.

According to this constitution, when a document including a particularly long content is delivered separated into plural blocks, these delivered pieces of data can be synthesized into an original structured document which is outputted to the application program. As a result, the waiting time for delivery to the application program can be shortened while the application program can receive delivered documents in a processible format.

Further, the document receiving device according to the present invention may be characterized in that the contents are of elements constituting the structured document, and the application program which issues the delivery request is provided with a delivery order specification means for specifying an order of delivering the contents of the elements.

According to this constitution, when the application program issues a delivery request to the document delivery device, the delivery request can be made specifying a delivery order. Therefore, necessary data can be obtained in an order suitable for the processing made by the application program. As a result, it is possible to shorten the delivery waiting time.

In the document receiving device according to the present invention, when the partial structure delivery unit 4 in the structured-document delivery device 1 as described above performs the stepwise delivery, a partial structure receiver unit 8 having a function as a document receiving device is provided at the receiving port of the structured-document application program 9 as shown in FIG. 11. The partial structure receiver unit 8 synthesizes the data pieces delivered step by step (① to ③) into a structured document processible by the structured-document application program 9, and outputs the document to the structured-document application program 9. Thus, a structured document necessary for processing in the structured-document application program can be steadily delivered.

As an example of the reception processing in case of receiving delivered element, at first, structure information may be received while reception of another request from the structured-document application program is stopped. Then, in a stage after the reception of the structure information is completed, the reception of another request from the structured-document application program may be restarted, and in parallel, reception of the other remaining information may be continued. If a reference request for a content which has not yet received comes from the structured-document application program, an operation to satisfy the request from the structured-document application program may be performed after waiting for completion of reception of the part.

According to another aspect of the present invention, there is provided a document delivery method of delivering a structured document, characterized by comprising: a delivery request transmission step of transmitting a document delivery request from an application program which executes a predetermined processing on the structured document; a delivery request reception step of receiving the delivery request; a specification step of separately specifying structure information and contents of a structured document to be delivered, based on the delivery request received; a generation step of obtaining the structure information or the contents from a predetermined storage unit and generating the structured document to be delivered, based on specification from the specification step; and a delivery step of delivering the structured document generated in the generation step to the application program.

According to further another aspect of the present invention, there is provided a document delivery program recorded on a recording medium readable from a computer, to make the computer execute a processing for delivering a structured document, characterized by comprising: a delivery request reception step of receiving a delivery request from an application program which executes a predetermined processing on the structured document; a specification step of separately specifying structure information and contents of a structured document to be delivered, based on the delivery request received; a generation step of obtaining the structure information or the contents from a predetermined storage unit and generating the structured document to be delivered, based on specification from the specification step; and a delivery step of delivering the structured document generated in the generation step to the application program.

According to further another aspect of the present invention, there is provided a document delivery system characterized by comprising: a document delivery device which delivers a structured document necessary for a predetermined processing to an application program which executes the predetermined processing on the structured document, including a reception means for receiving a delivery request from the application program, a specification means for separately specifying structure information and contents of a structured document to be delivered, based on the delivery request received by the reception means, a generation means for obtaining the structure information or the contents from a predetermined storage unit and generating the structured document to be delivered, based on specification from the specification means, and a delivery means for delivering the structured document generated by the generation means to the application program; and a document receiving device which receives the structured document delivered from the document delivery device.

BRIEF DESCRIPTION OF THE DRAWINGS

FIG. 3 shows an example of an input document;

FIG. 4 shows an output document generated from the input document shown in FIG. 3, in accordance with the output commands shown in FIG. 2;

FIG. 7 shows an example of an output document generated with respect to the input document shown in FIG. 3, in accordance with the output commands in FIG. 5;

FIG. 8 is a view showing an example of predefinition information (DTD) of an input document;

FIG. 9 is an example of an output document which matches the DTD;

FIG. 14 shows an example of reference information (XSLT style-sheet) of a structured-document application program;

FIG. 15 shows examples of output commands generated from the XSLT style-sheet shown in FIG. 14;

FIG. 17 shows an example of an input document;

FIG. 21 is a view showing an example of predefinition information (DTD) with respect to the input document shown in FIG. 17;

FIG. 22 is an example of a generated output document;

FIG. 25 shows an example of an input document;

FIG. 26 shows an example of an output document generated by the output commands shown in FIG. 24;

FIG. 28 shows examples of output commands with a priority order;

BEST MODE FOR CARRYING OUT THE INVENTION

Embodiments of the present invention will now be described in detail with reference to the drawings.

Embodiment 1

Figure 12:
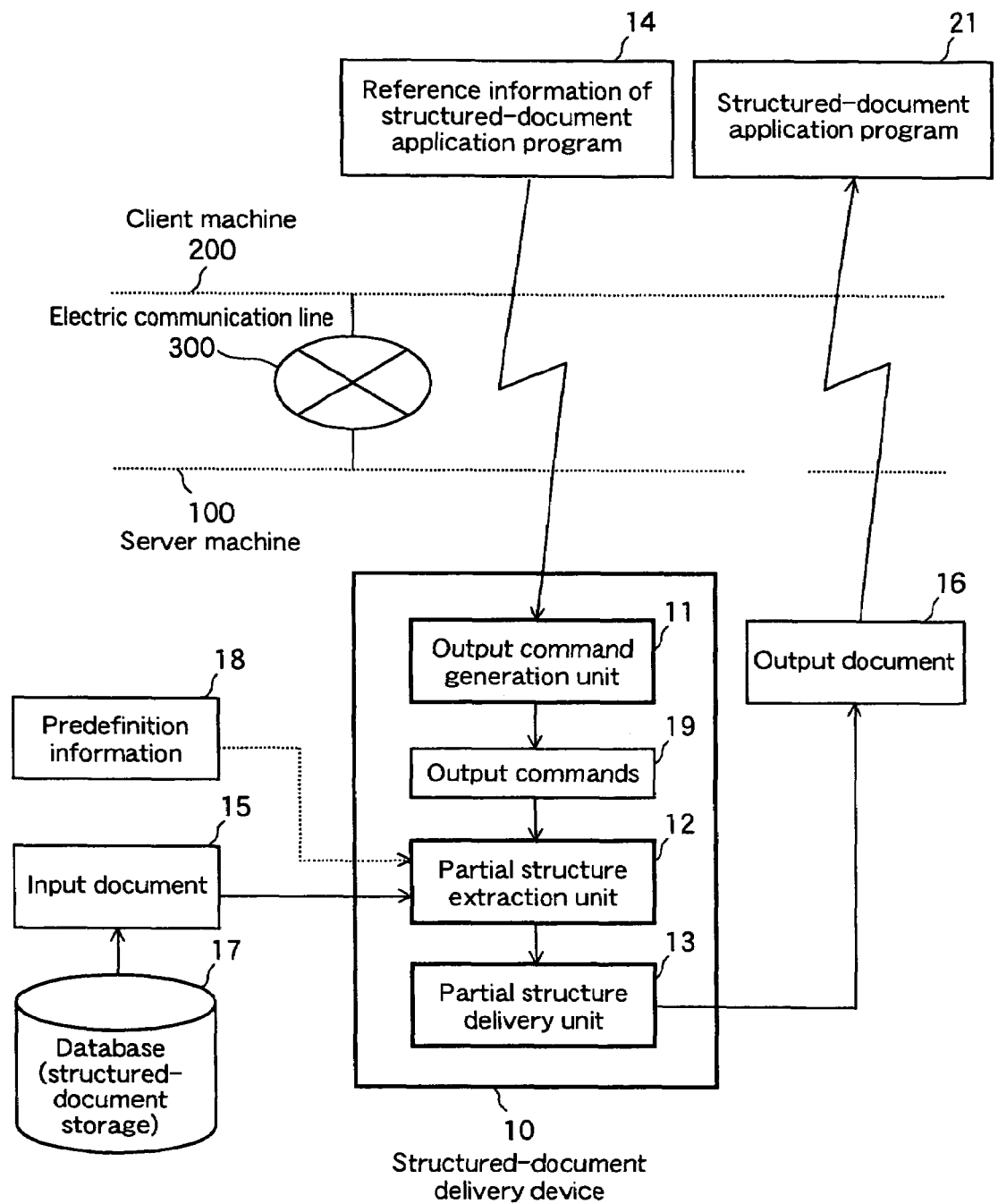
FIG. 12 is a block diagram showing the basic structure of the embodiment 1.

The present embodiment exemplifies a structured-document delivery system which delivers a structured document in the XML format in response to a delivery request from a structured-document application program, and describes the operation of the system in detail. FIG. 12 is a block diagram showing the basic structure of the present embodiment. In the figure, a server machine 100 and a client machine 200 are connected by an electronic communication line 300. Structured-documents are delivered from a structured-document delivery device 10 provided in the server machine 100 to a structured-document application program 21 included in the client machine 200.

The server machine 100 has a database (structured-document storage) 17 which stores structured documents in the XML format, in addition to the structured-document delivery device 10. The structured-document delivery device 10 reads a structured document (input document) from the database 17, generates a document (output document) 16 to be delivered, and delivers it to the client machine 200. Definition information (predefinition information) 18 concerning the document structure is preset in the structured document handled in the present embodiment. When generating the output document 16, this predefinition information 18 is referred to. This predefinition information 18 is stored in a predetermined storage area in the server machine 100 and is referred to herefrom.

The structured-document delivery device 10 is constructed by an output command generation unit 11, a partial structure extraction unit 12, and a partial structure delivery unit 13, like in the principle view described previously in "Disclosure of the Invention". The output command generation unit 11 receives reference information 14 of a structured-document application program, analyzes the received reference information, and specifies in the output commands 19 the structure information and contents of the structured document to be delivered. The partial structure extraction unit 12 reads an input document 15 from the database 17 and generates an output document 16, referring to the output commands 19. The partial structure delivery unit 13 delivers the output document 16 to the structured-document application program 21. The basic functions of the structured-document delivery device 10 according to the present embodiment are substantially the same as the principles described in "Disclosure of the Invention". In the present invention, the input document 15 and the output document 16 may be expressed in a text format or DOM format and are thus not particularly limited.

In the present embodiment, the structured-document application program 21 of the client machine 200 is a XSLT (XML Style-sheet Language Transformations: W3C Recommendation 16, Nov. 1999) processor, and a XSLT style-sheet which determines the output of the XSLT processor (structured-document application program) 21 is used as reference information 14 of the structured-document application program. The XSLT style-sheet is transmitted as a delivery request to the structured-document delivery device 10 of the server machine 100 through an electric communication line 300.

Figure 13:
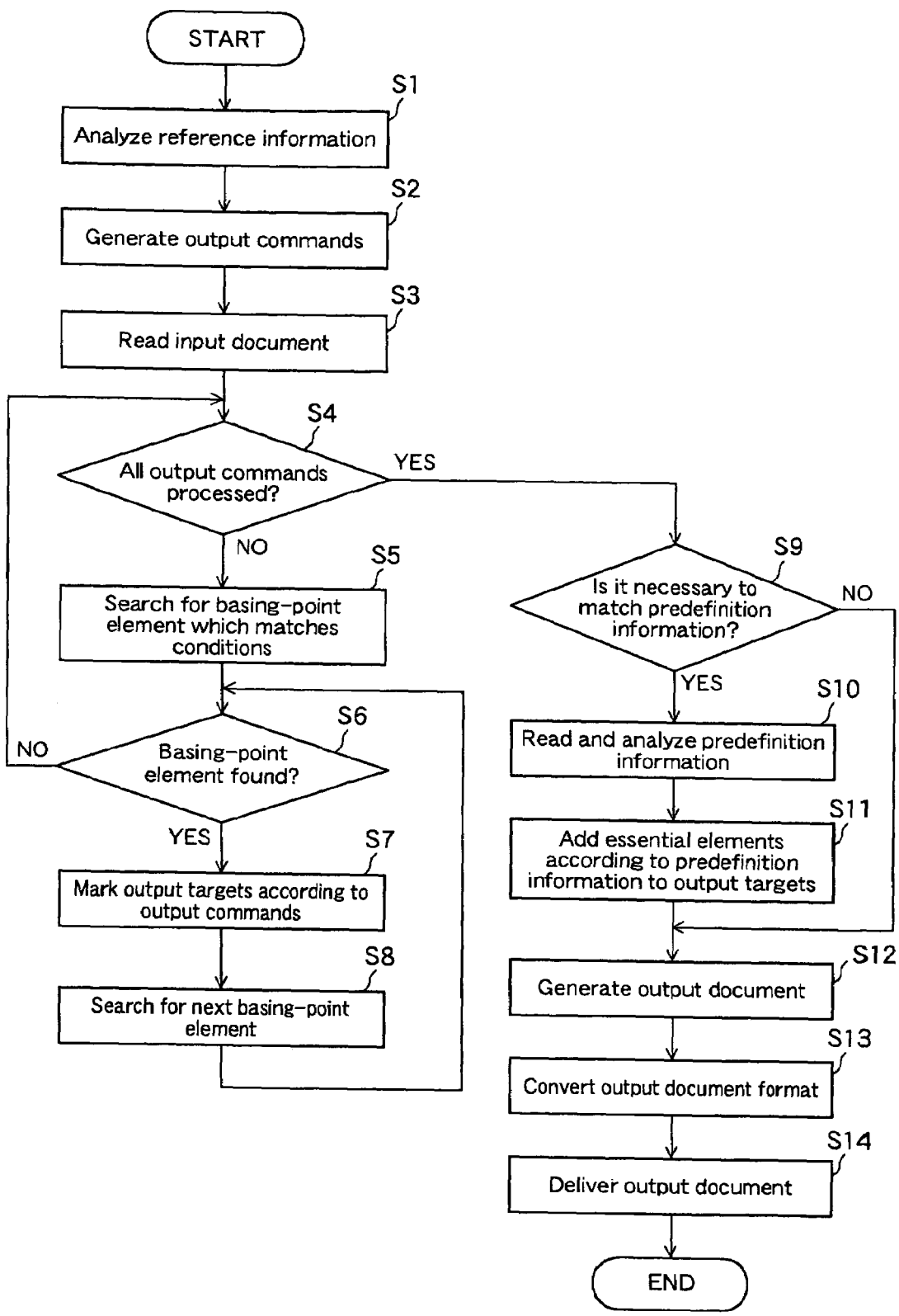
FIG. 13 is a flowchart showing the entire flow of structured-document delivery processing.

FIG. 13 is a flowchart showing the flow of the whole processing in the present embodiment. The operation of the present system will be specifically described along the flowchart.

At first, the output command generation unit 11 of the structured-document delivery device 10 receives reference information 14 (XSLT style-sheet) of the structured-document application program from the structured-document application program (XSLT processor) 21 of the client machine 200, and reads and analyzes the reference information 14 (S1). FIG. 14 shows an example of the XSLT style-sheet 14. The output command generation unit 11 analyzes the information to know that, in the XSLT processor 21, the contents of elements "product/name" and "product//domestic" ("//" denotes a descendent relationship) should be extracted with reference to the element "product", from the XSLT style-sheet 14 shown in FIG. 14. Then, the unit 11 generates output commands 19 (S2). Hereinafter, the elements which the structured-document application program (XSLT processor) 21 requires will be referred to as basing-point elements.

FIG. 15 shows examples of output commands 19 generated from the XSLT style-sheet 14 shown in FIG. 14. The upper three commands are output commands concerning structure information while the lower four commands are output commands concerning contents. The commands 1 to 3 respectively mean outputting of the tags of product, product/name, and product//domestic each of which is necessary as structure information for the XSLT processor 21. The commands 5 to 7 mean that the contents of "product/name" and "product//domestic" are required while the contents of "product" (the other remaining one) are not required. The command 4 is an output command for outputting the contents of the other elements than "product", which is reference information specific to the XSLT processor 21. The symbol "/" of an upper-level condition means the root of the document, and "*" means the all tag names. That is, the collation condition of the command 4 means that "root elements having any tag name are set as basing-point elements".

Figure 16:
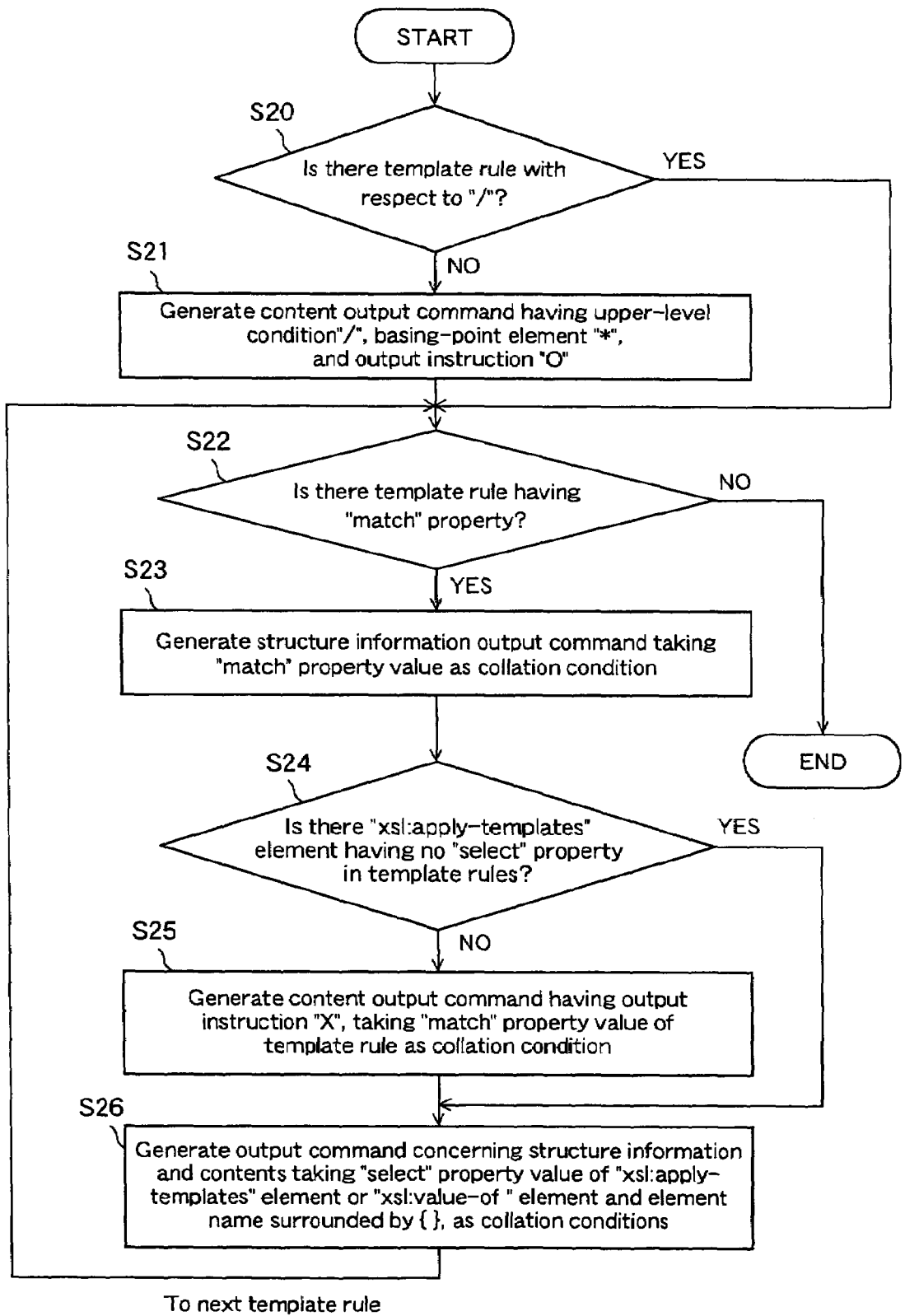
FIG. 16 is a flowchart showing the details of the flow of output command generation processing.

FIG. 16 is a flowchart showing the details of the flow of processing of generating the output commands 19 shown in FIG. 15 from the XSLT style-sheet 14 shown in FIG. 14. This flowchart shows an example of processing in case where the reference information 14 of a structured-document application program is a XSLT style-sheet. If the reference information and operational specifications of a structured-document application program 21 are different from those of the XSLT style-sheet, the flowchart then differs.

Firstly, in S20 and S21 in FIG. 16, processing concerning a build-in template rule according to the specification of XSLT is executed. In the style-sheet shown in FIG. 14, there is no template rule (<xsl:template match="/">) concerning "/" (NO in S20). Therefore, an output command for an upper-level condition "/", a basing-point element "*", and an output instruction "O" is generated (S21). The command 4 in FIG. 15 is thus generated.

Subsequently, processing is performed for template rules (<xsl:template> element). If the XSLT style-sheet 14 has a template rule having a "match" attribute (YES in S22), an output command concerning the structure information is generated, taking as a basing-point element a node which matches a location path pattern described in the "match" attribute while taking the other conditions as (upper-level or lower-level) collation conditions (S23). In the style-sheet shown in FIG. 14, "product" (only the basing-point element) applies to this case, and the command 1 in FIG. 15 is generated. Since this template rule (<xsl:template match="product">) does not have an element of xsl:apply-templates having no "select" attribute (NO in S24), the command 5 having an output instruction of "x" is generated concerning the "match" attribute "product" (S25).

Finally, an output command concerning the structure information and contents is generated with respect to the "select" attribute of the element of "xsl:apply-templates" and the element of "xsl:value-of" in the template rule, and the element name in {} (S26). In the style-sheet shown in FIG. 14, the "name" and "domestic" apply to this, and the commands 2, 3, 6, and 7 shown in FIG. 15 are generated. At this time, location paths (which are the other paths than that of the basing-point element) described in the "match" attribute and the "select" attribute in the template rule are added to the collation condition of each output command. For example, in the command 2 in FIG. 15, "name" is the basing-point element and another path ("product/") than "name" is set as an upper-level condition. If the "select" attribute is a current node ("."), the output command generated in S25 is rendered invalid, and an output command concerning contents for the "match" attribute is generated. The processing described above is performed on all the template rules, to obtain the final output commands (FIG. 15).

Figure 18:
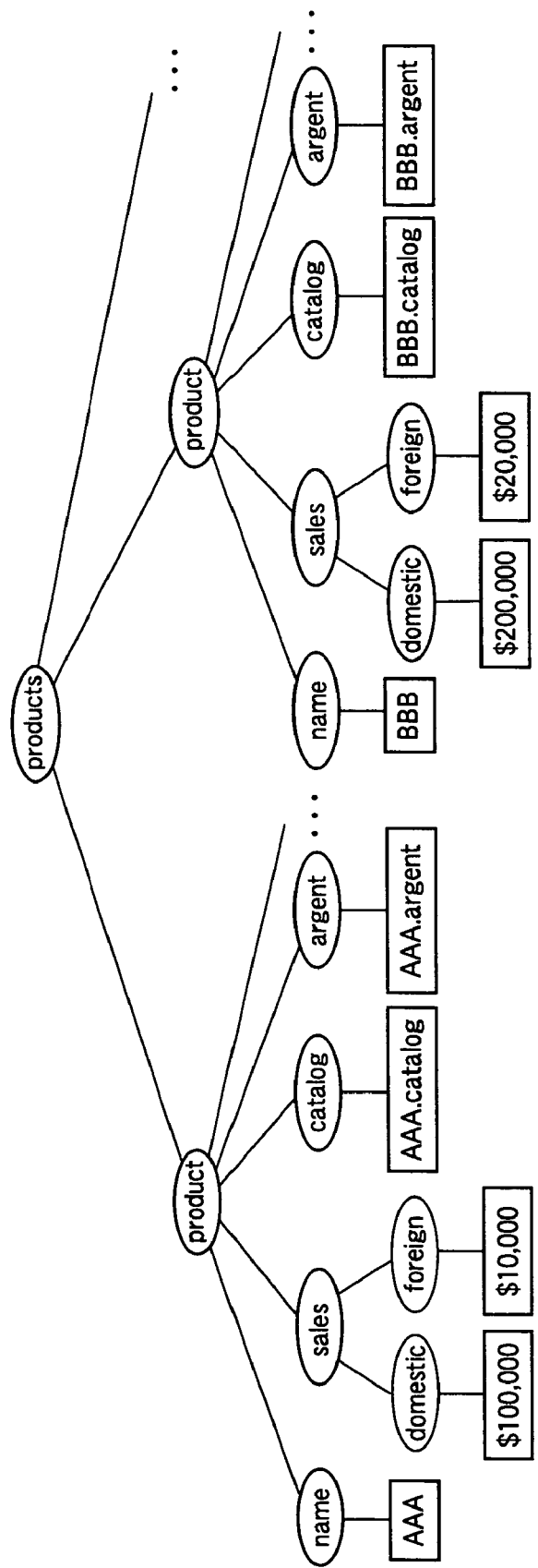
FIG. 18 is a tree view expressing the input document shown in FIG. 17.

The output commands 19 which specify the structured-document to be delivered are thus generated. Next, a structured-document (input document 15) as a target to be processed is read from the database 17 (FIG. 13: S3). FIG. 17 shows an example of the input document 15 read, and FIG. 18 is a tree view expressing the input document 15 of FIG. 17.

The partial structure extraction unit 12 searches for, in regard to the input document 15 shown in FIG. 17, basing-point elements which matches the collation conditions of the output commands 19 in FIG. 15 (FIG. 13: S5). The method of searching for a basing-point element varies depending on the format of the input document 15. However, if the input document 15 has the DOM format, the input format may be directly used as an internal format, and an element which matches the collation condition may be searched for by traversing the DOM tree thereof.

If a basing-point element which matches the collation condition exists in the input document (YES in S6), a mark indicative of being an output target is added in correspondence with the elements and the contents of the elements in the input document, in accordance with the output commands 19. For example, in case of an output command concerning structure information, the basing-point element and intermediate elements from a root element to the basing-point element are marked up with tags. In case of an output command concerning contents, the contents of the basing-point element are marked (S7). At this time, in case of a basing-point element at which a non-output instruction "x" is specified, the contents thereof are not marked and are excluded from output targets. This marking processing may be performed by setting a flag on a predetermined storage area, corresponding to each element or contents thereof in the input document developed on the memory. Thus, the method of the marking processing is not limited particularly.

The search processing (S4 to S8) for searching a basing-point element is repeated with respect to all the basing-point elements in the input document that match the collation conditions of all output commands.

If any output document which matches the predefinition information 18 is not generated (NO in S9) in the stage after the search processing for a basing-point element is finished (YES in S4), only the above-described marked elements or contents are extracted and an output document is generated (S12).

If different output instructions are specified for the same element, all the targets are outputted as long as the output instructions thereof are specified, or priorities are given to output commands and the output instruction having the highest priority is observed. For example, a rule that "a later output command has a higher priority" may be given in advance. Then, among the output commands shown in FIG. 15, "non-output of the contents of the "product" element (command 5)" has a higher priority than "output of the contents of all elements (command 4)". The priority of "output of contents of the "name" element (command 6)" is much higher, and the priority of "output of the contents of the "domestic" element (command 7)" is the highest.

Figures 19, 20:
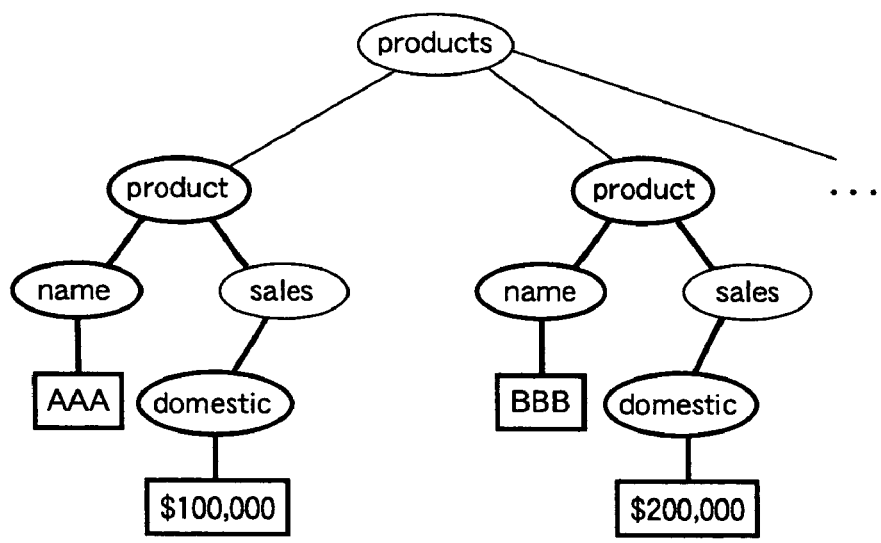
FIG. 19 shows an example of an output document generated with respect to the input document shown in FIG. 17, in accordance with the output commands shown in FIG. 15.
FIG. 20 is a tree view expressing the document shown in FIG. 19.

FIG. 19 shows an example of an output document 16 which is generated according to the output commands 19 shown in FIG. 15, in regard to the input document 15 shown in FIG. 17. FIG. 20 is a tree view showing the document of FIG. 19. In FIG. 20, bold-line frames correspond to structure information and contents outputted by the output commands 19, and thin-line frames correspond to structure information outputted as paths from a root element to basing-point elements. In the present embodiment, the program in the partial structure extraction unit 12 is previously added with definitions, i.e., structure information and contents are specified by the output commands 19, and paths from a root element to basing-point elements are included as output elements of the structure information. The processing is carried out such that the output document 16 to be finally outputted reflects these definitions.

The output document 16 thus generated is converted by the partial structure delivery unit 44 into a format which the structured-document application program 21 can process (S13 in FIG. 13), and is then delivered to the structured-document application program 21 (S14).

In the present embodiment, the XSLT processor 21 is inputted with the XSLT style-sheet 14 shown in FIG. 14 and the output document 16 shown in FIG. 19, and performs XML structure conversion processing. When the output document 16 shown in FIG. 19 is inputted, the output result of the structure conversion processing is the same as that when the input document 15 shown in FIG. 17 is inputted.

In some structured-document application programs 21, verification of the document structure is performed on structured documents by the predefinition information 18 which defines the document structure. If a structured-document application program 21 requires a structured document which matches the predefinition information 18, the partial structure extraction unit 12 analyzes the predefinition information 18 (S10 in FIG. 13) and adds elements defined to be essential in the predefinition information 18, to output targets (S11).

FIG. 21 shows an example of the predefinition information 18 with respect to the input document 15 shown in FIG. 17. The predefinition information 18 shown in FIG. 21 is called a document type definition (DTD) in the XML format, and defines in form of a list the root element, the types of elements appearing in a document, and the positions and the number of appearances thereof. Further, the number of appearances of an element is defined by symbols such as "*", "+", and "?". For example, "?" means that an elements appears "0 times or once", so that the element may appear or not (omissible). If no symbol is given, it means that the element "always appears once", so that the element has to appear once (not omissible).

Based on these definitions, the predefinition information 18 shown in FIG. 21 is analyzed to obtain the following omissible/non-omissible information.

1. When a "product" element is outputted, the "product" element is omissible.
2. When a "product" element is outputted, the "name" element is not omissible and the other elements are omissible.
3. When a "sales" element is outputted, the "domestic" element and the "foreign" element are not omissible.

With respect to all the elements marked as output targets through S4 to S8 shown in FIG. 13, the partial structure extraction unit 12 checks whether there is a non-omissible element or not, based on the predefinition information 18 described above, when the elements are outputted. If there is a non-omissible element, the element is added to the output targets (marking is carried out).

For example, in the predefinition information 18, the "name" is not omissible if the "product" is outputted, and the "domestic" and "foreign" are not omissible if the "sales" is outputted. Therefore the "name", "domestic" and "foreign" elements are added to the output targets. In this case, the "name" and "domestic" elements have already been output targets according to the output commands 19. Therefore, the "foreign" element is newly added.

Figures 23, 24:
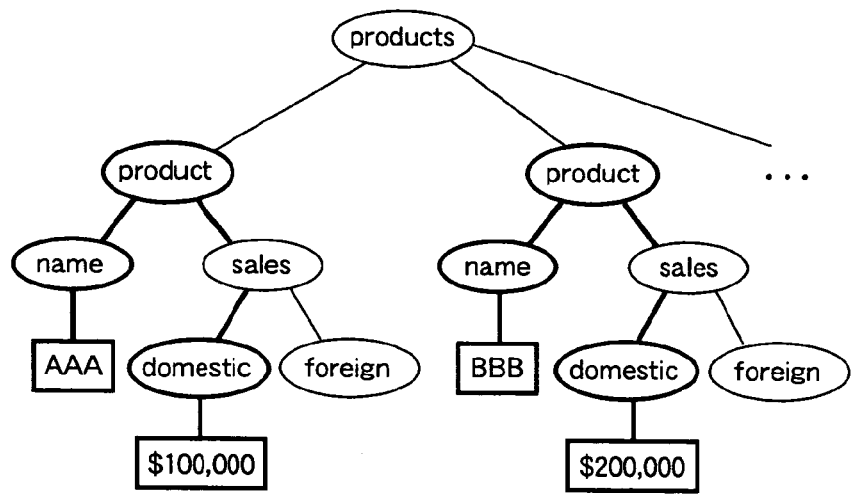
FIG. 23 expresses FIG. 22 in a tree view.
FIG. 24 shows examples of output commands including a lower-level condition.

In the stage after all the elements as output targets have thus been checked completely, an output document 16 is generated (S12 in FIG. 13). FIG. 22 shows an example of the generated output document 16, and FIG. 23 is a tree view expressing FIG. 22. The output document 16 shown in FIG. 22 matches the predefinition information 18 shown in FIG. 21. Therefore, a delivered document can be correctly analyzed and processed even if the delivery destination is a structured-document application program which verifies the document structure.

Embodiment 2

The embodiment 1 exemplifies output commands which consist only of the basing-point elements and upper-level conditions and do not include lower-level conditions. The present embodiment, however, exemplifies output commands including a lower-level condition. The basic structure of the structured-document delivery system are the same as that of the embodiment 1.

Figures 1, 2:
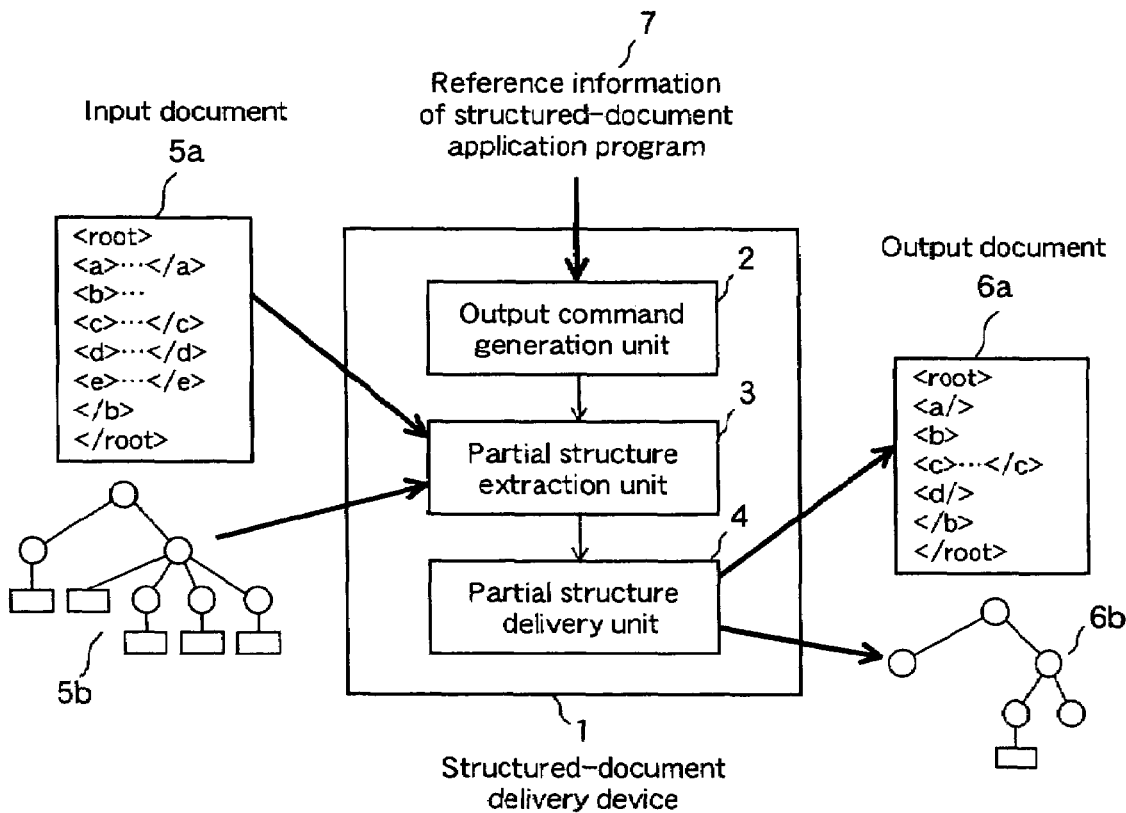
FIG. 1 shows principles of the present invention.
FIG. 2 shows examples of output commands generated by an output command generation unit.
Figures 5, 6:
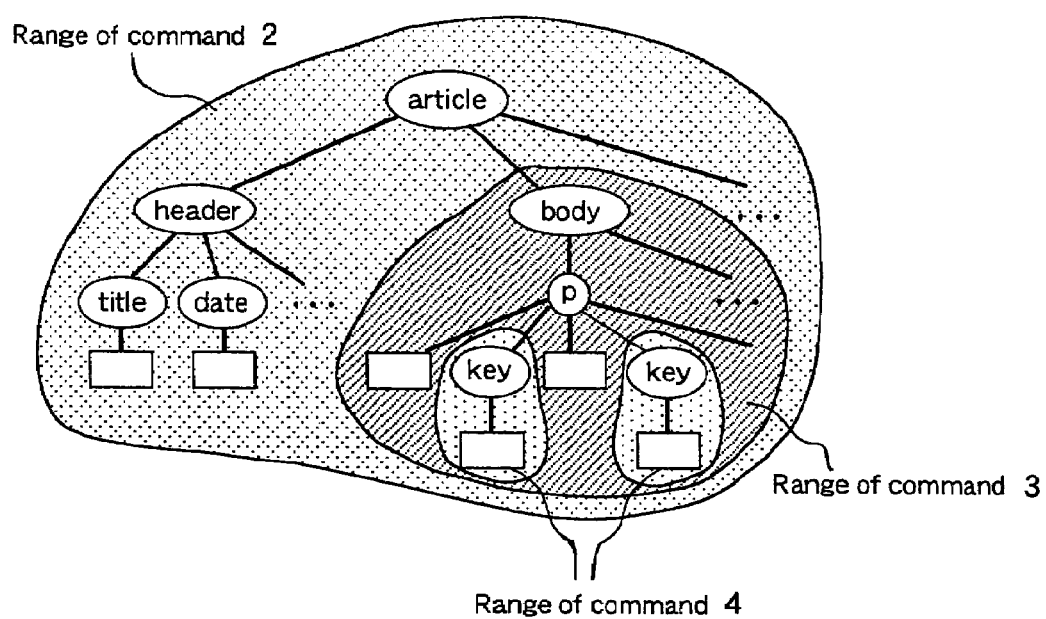
FIG. 5 shows examples of output commands including "non-output" instructions.
FIG. 6 is a view showing overlapping ranges of the output commands concerning contents in FIG. 5.
Figures 10, 11:
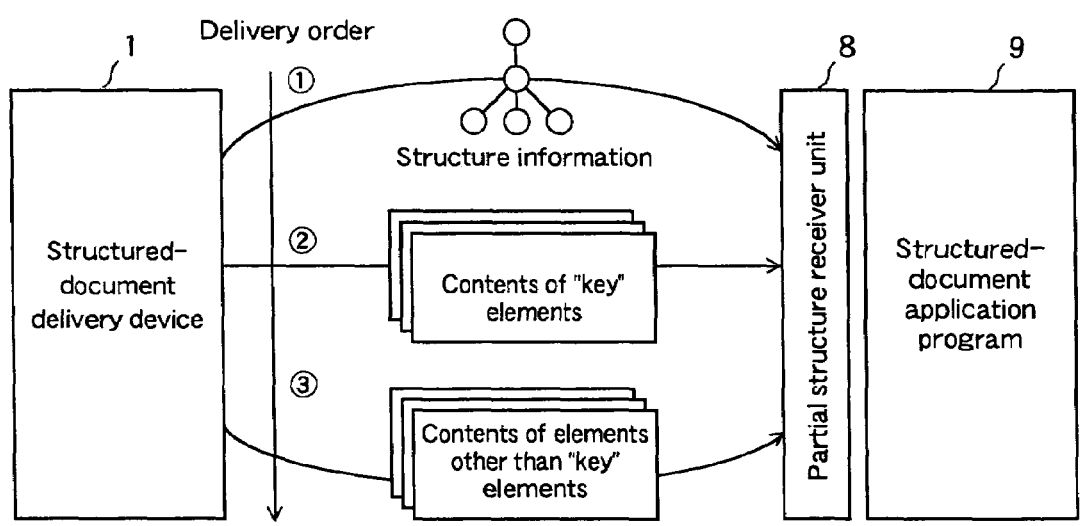
FIG. 10 shows examples of output commands with a priority order concerning delivery.
FIG. 11 shows principles of stepwise delivery processing.

FIG. 24 shows examples of output commands including a lower-level condition. This figure shows an output command in which a lower-level condition is added to the command 1 in FIG. 5. Note that "@" means a attribute (more correctly the attribute of the basing-point element "key"), and "=" means that the value of the "level" attribute is "3". In the present embodiment, an output document is generated with use of an input document shown in FIG. 25.

According to the output commands shown in FIG. 24, the output document shown in FIG. 26 is generated. Compared with the output document shown in FIG. 7, only the "key" tag having 3 as the value of the "level" attribute is outputted, and the other "key" tag is not outputted. With respect to the outputted "key" tag, the "level" attribute is not outputted. If the "level" attribute should be outputted, an output command for structure information and contents which takes the "level" attribute as a basing-point element should be specified separately.

Thus, in this embodiment according to the present invention, it is possible to generate an output command constituted by various conditions. Unnecesary elements are hence excluded so that structured-document application programs can obtain a document consisting only of actually necessary elements.

Embodiment 3

Figure 27:
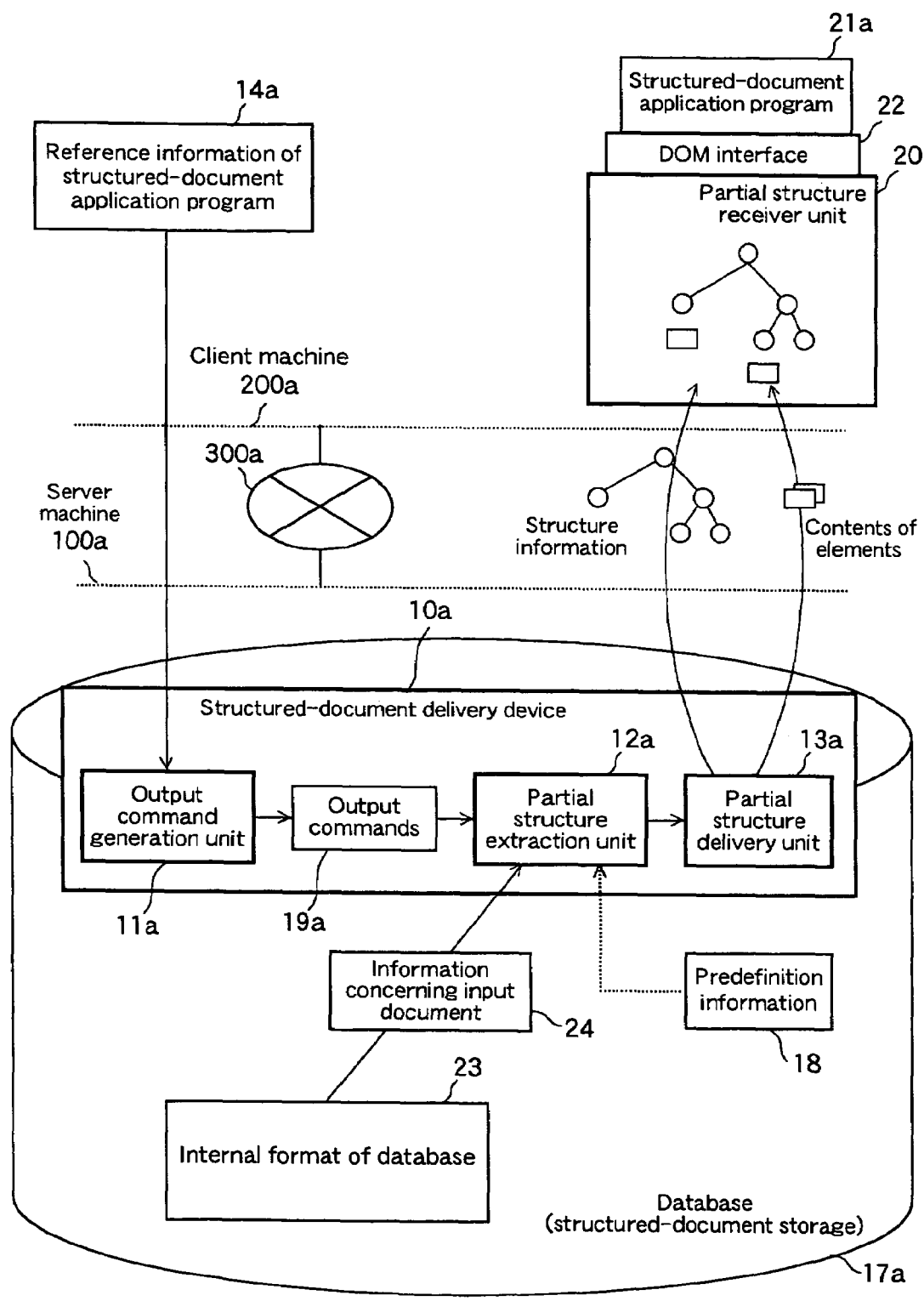
FIG. 27 is a block diagram showing the basic structure of the structured-document delivery system according to the embodiment 3.

In the present embodiment, a description will be made of an example in which output documents with the priority order are delivered to a structured-document application program. FIG. 27 is a block diagram showing the basic structure of the structured-document delivery system according to the present embodiment.

Like in the embodiment 1, a server machine 100*a* and a client machine 200*a* are connected through an electric communication line 300*a*. The server machine 100*a* is provided with a structured-document delivery device 10*a*, like the embodiment 1. In the present embodiment, however, the structured-document delivery device 10*a* is incorporated in a database (structured-document storage) 17*a*, and a partial structure extraction unit 12*a* directly accesses the internal format 23 of the database 17*a*.

The client machine 200*a* is provided with a partial structure receiver unit 20 which synthesizes output documents delivered in the order of priority. Further in the present embodiment, structured documents are delivered in the DOM format. Therefore, a structured-document application program 21*a* is provided with a DOM interface 22, so that structured documents on a main memory which have been synthesized by the partial structure receiver unit 20 can be accessed.

The procedure of processing executed in the present embodiment is basically the same as the embodiment 1 up to the step where an output document is generated (S12 in FIG. 13). In the embodiment 1, the partial structure extraction unit 12 reads an input document from the database 17 and generates the output document. In contrast, in the present embodiment, only the structure information of the input document is read out from the internal format 23 of the database 17*a* to achieve generation. It is therefore unnecessary to read out the input document containing all the text data simultaneously. Then, separately from the structure information, only the contents of the elements which are output targets to be outputted are read from the internal format 23 of the database 17*a*. That is, since the structured-document delivery device 10*a* is incorporated in the database 17*a*, the internal format 23 of the database 17*a* can be accessed directly, and the structure information and the contents can be obtained individually. Accordingly, the costs for extracting data from the database 17*a* can be reduced.

Also in the present embodiment, if priorities are given to content output instructions of output commands, the partial structure delivery unit 13*a* delivers at first the structure information of an output document, and subsequently delivers the contents of elements in the order from the highest priority. FIG. 28 shows examples of output commands with priorities. In this figure, priorities are given to the output commands shown in FIG. 15, expressing that the priorities are in the order of the command 6, command 7, and command 4 from the highest one (where the command 5 undergoes a non-output instruction).

This priority order may be predetermined by reference information 14*a* of a structured-document application program For example, in the reference information 14*a*, it may be predetermined that the priority should lower in the written order. Then, the priority may be determined at the time when the output command generation unit 2*a* analyzes the reference information 14*a*, and an output command may accordingly be generated. Alternatively, the client machine 200*a* may be provided with a determination unit (not shown) which determines the priority. Then, in the stage where a structured-document application program 21*a* creates reference information 14*a*, a determination result from the determination unit may be reflected on the reference information 14*a*. For example, if the priority order is specified (or the written order in the reference information is changed) such that a long text content should be delivered later, the delivery order can be controlled. Accordingly, the waiting time for delivery to the structured-document application program 21 can be shortened.

The partial structure receiver unit 20 of the client machine 200*a* synthesizes data delivered orderly from the partial structure delivery unit 13*a*, into one structured document, and outputs the document to the structured-document application program 21*a*.

Figure 29:
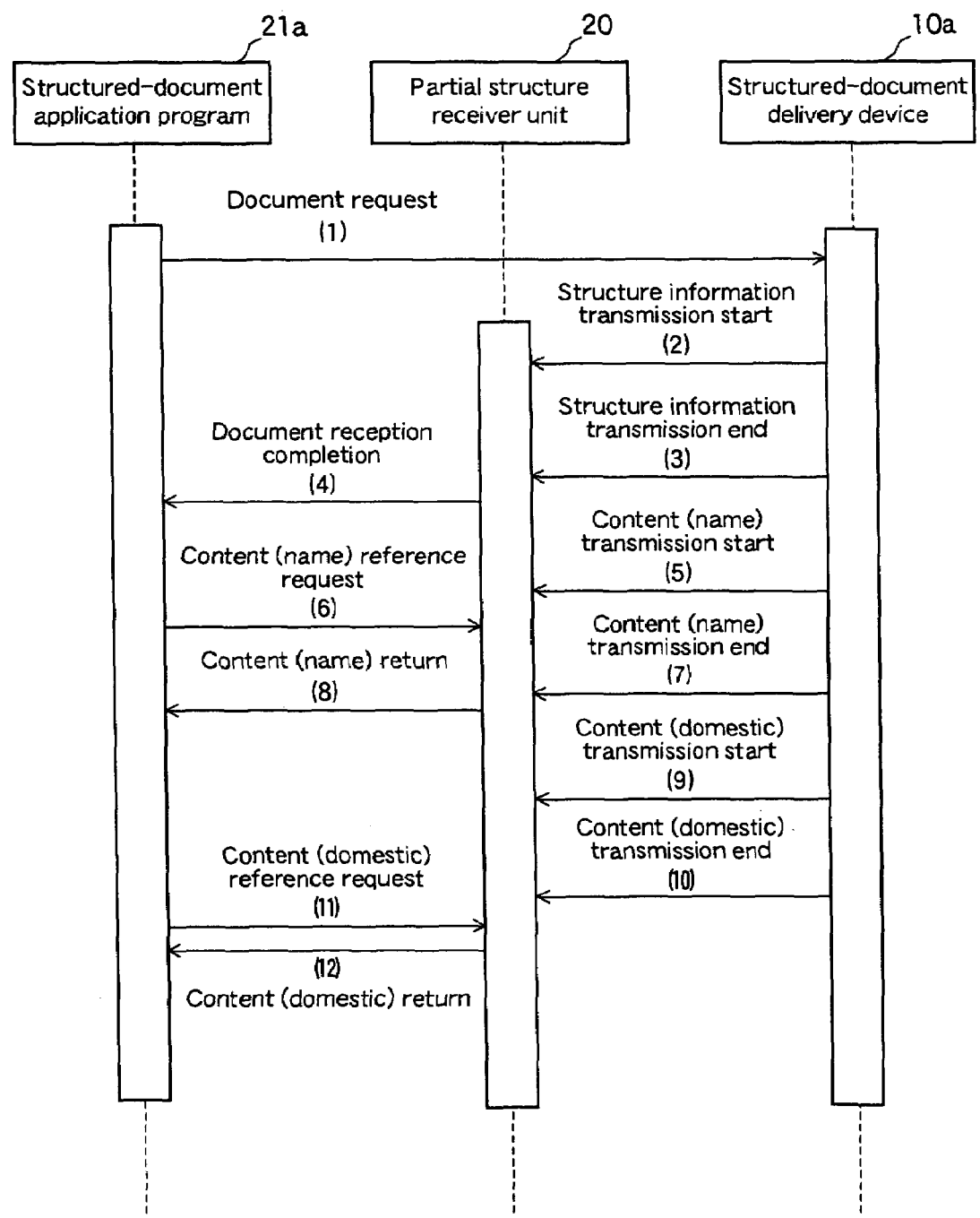
FIG. 29 is a sequence view between a structured-document delivery device and a structured-document application program in case of performing delivery in a priority order.

FIG. 29 is a sequence chart between the structured-document delivery device 10*a* and a structured-document application program 21*a*. When a document request is received from a structured-document application program 21*a* (1), the structured-document delivery device 10*a* transmits at first the structure information of an output document which has extracted only the parts necessary for the structured-document application program 21*a* (2). In the stage after the transmission of the structure information is completed (3), if the partial structure receiver unit 20 is notified of a message indicative of complete document reception by the structured-document application program 21*a* (4), the structured-document application program 21*a* can start processing on the document requested. Next, the structured-document delivery device 10*a* starts transmission of the contents. In the present embodiment, if the structured-document application program 21a attempts to refer to contents of an element before transmission of the contents of the element is completed, the partial structure receiver unit 20 locks (waits) until the transmission of the contents is completed. In FIG. 29, if the structured-document application program 21a issues a reference request for referring to the "name" element before transmission of the contents of the "name" element is completed (6) after this transmission has been started (5), the partial structure receiver unit 20 waits until the transmission of the contents of the "name" element is completed. After the transmission of the contents of the "name" element is completed (7), the contents are returned to the structured-document application program 21a (8), and the procedure goes to the next content transmission processing. However, no lock (waiting) occurs if the partial structure receiver unit 20 receives from the structured-document application program 21a a reference request for referring to an element whose contents have been transmitted completely, like in the content transmission processing for the "domestic" element through (9) to (12) in FIG. 29.

Figure 30:
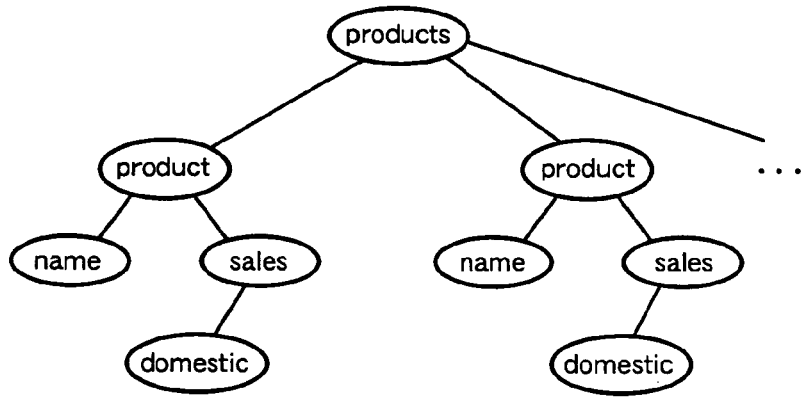
FIG. 30 is a view showing how the partial structure receiver unit synthesizes a structured document in case where a structured document is delivered in a priority order (structure information)
Figure 31:
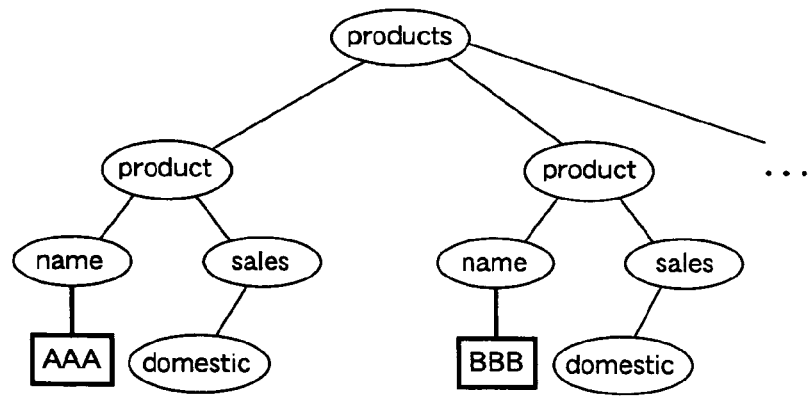
FIG. 31 is a view showing how the partial structure receiver unit synthesizes a structured document in case where a structured document is delivered in a priority order (contents of "name" elements)
Figure 32:
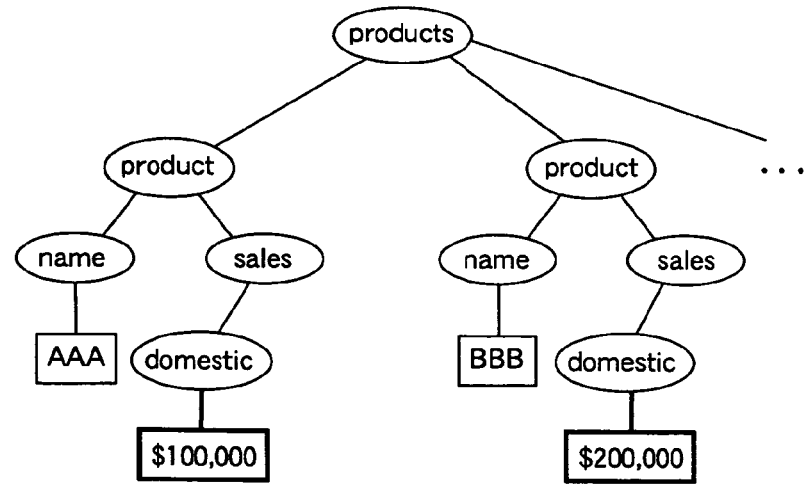
FIG. 32 is a view showing how the partial structure receiver unit synthesizes a structured document in case where a structured document is delivered in a priority order (contents of "domestic" elements).

FIGS. 30 to 32 show how the partial structure receiver unit 20 synthesizes a structured document when the same output document as shown in FIG. 19 is delivered in the priority order shown in FIG. 28. The partial structure receiver unit 20 receives at first only the structure information of the output document (FIG. 30), and subsequently receives the contents of the "name" element (FIG. 31) and then the contents of the "domestic" element (FIG. 32). In the received order, the unit 20 composes a structured document to become input data to the structured-document application program 21a.

The embodiments 1 to 3 have thus been described in the above. However, the present invention is not limited to the system realized in the server-client form but a structured-document delivery device and a structured-document application program may be installed in one single machine.

Likewise, the structures and operations of the structured-document delivery device described in the above embodiments and those of the client machine which receives structured documents are merely examples to realize the present invention. Needless to say, the structures are not particularly limited but can be appropriately modified as long as the structures do not deviate from the scope of the subject matters of the present invention.

INDUSTRIAL APPLICABILITY

As has been described above, according to the present invention, necessary elements in a document can be extracted and delivered, separating structure information and contents from each other. Therefore, only the information which is actually necessary for a structured-document application program is delivered. As a result, the delivery costs can be reduced and the calculation resources used by the structured-document application program can be saved.

In addition, the output document (delivered document) received by the structured-document application program includes the structure from basing-point elements to a root element. It is therefore guaranteed that the relationships between the elements are equivalent to the input document (original structured document). Moreover, according to the present invention, it is possible to generate an output document which matches definition information defining the document structure, such as DTD or the like. Therefore, verification of the document structure can be executed properly in the structured-document application program.

Further, the structured-document application program can start processing before delivery of all information is completed, by using a means for delivering the output document step by step. Therefore, the time of waiting for delivery can be shortened. The present invention is accordingly advantageous in case of delivering a document having a particularly long content.

The invention claimed is:

1. A document delivery device which delivers a structured document necessary for a predetermined processing to an application program which executes the predetermined processing on the structured document, comprising:
   reception means for receiving reference information from the application program and analyzing the received reference information by identifying what elements of the structured document are necessary and what contents of the structured document are necessary for the processing by the application program;
   specification means for separately specifying structure information, by tags or attributes, and contents, by text data that is marked up with tags or attribute values, of the structured document to be delivered, based on the analysis of the reference information received by the reception means;
   generation means for obtaining the structure information or the contents from a predetermined storage unit and generating the structured document to be delivered, based on specification from the specification means; and
   delivery means for delivering the structured document generated by the generation means to the application program.

2. The document delivery device according to claim 1, wherein the specification of the structure information made by the specification means is carried out by writing at least types of elements constituting the structured document, appearance environments of the elements, or conditions concerning the contents of the elements.

3. The document delivery device according to claim 1, wherein the specification of the contents made by the specification means is carried out by writing at least types of elements constituting the structured document, appearance environments of the elements, or conditions concerning the contents of the elements.

4. The document delivery device according to claim 1, wherein the generation means generates the structured document including a hierarchical structure from elements constituting the structure information specified by the specification means to a root of the document requested by the delivery request.

5. The document delivery device according to claim 1, wherein
   the structured document defines definition information concerning the document structure, and
   the generation means generates the structured document, based on the definition information in addition to the specification by the specification means.

6. The document delivery device according to claim 1, wherein the delivery means separates the structured document generated by the generation means into the structure information and the contents, and delivers the structure information and the contents, with a priority given to the structure information.

7. The document delivery device according to claim 6, wherein the delivery means has determination means for determining a delivery order of the contents of respective elements constituting the structured document generated by the generation means, and delivers the contents of the elements, based on the order determined by the determination means, after delivering the structure information.

8. The document delivery device according to claim 6, wherein the specification means has delivery order specification means for specifying a delivery order of the contents of respective elements constituting the structured document to be delivered, and the delivery means delivers the structure information and thereafter delivers the contents of the elements constituting the structured document generated by the generation means, based on the order specified by the delivery order specification means.

9. A document receiving device comprising:

document reception means for receiving a structured document delivered from the document delivery device according to claim 1; and output means for outputting the structured document received by the document reception means, to the application program.

10. The document receiving device according to claim 9, further comprising synthesis means for synthesizing plural blocks to generate the structured document delivered when the document reception means receives the structured document separated into the plural blocks, and characterized in that the output means outputs the structured document synthesized by the synthesis means to the application program.

11. The document receiving device according to claim 9, wherein the contents are of elements constituting the structured document, and the application program which issues the delivery request is provided with delivery order specification means which specifies an order of delivering the contents of the elements.

12. A document delivery method of delivering a structured document, comprising:

transmitting reference information from an application program which executes a predetermined processing on the structured document;

receiving the reference information and analyzing the received reference information by identifying what elements of the structured document are necessary and what contents of the structured document are necessary for the processing by the application program;

separately specifying structure information, by tags or attributes, and contents, by text data that is marked up with tags or attribute values, of the structured document to be delivered, based on the analysis of the reference information received;

obtaining the structure information or the contents from a predetermined storage unit and generating the structured document to be delivered, based on specification from the specification step; and delivering the structured document generated in the generation step to the application program.

13. A document delivery program tangibly embodied on a computer-readable medium, to make the computer execute a processing for delivering a structured document, comprising:

receiving reference information from an application program which executes a predetermined processing on the structured document;

analyzing the received reference information by identifying what elements of the structured document are necessary and what contents of the structured document are necessary for the processing;

separately specifying structure information, by tags or attributes, and contents, by text data that is marked up with tags or attribute values, of the structured document to be delivered, based on the analysis of the reference information received;

obtaining the structure information or the contents from a predetermined storage unit and generating the structured document to be delivered, based on specification from the specification step; and delivering the structured document generated in the generation step to the application program.

14. A document delivery system comprising:

a document delivery device which delivers a structured document necessary for a predetermined processing to an application program which executes the predetermined processing on the structured document, including reception means for receiving reference information from the application program and analyzing the received reference information by identifying what elements of the structured document are necessary and what contents of the structured document are necessary for the processing by the application program, specification means for separately specifying structure information, by tags or attributes, and contents, by text data that is marked up with tags or attribute values, of the structured document to be delivered, based on the analysis of the reference information received by the reception means, generation means for obtaining the structure information or the contents from a predetermined storage unit and generating the structured document to be delivered, based on specification from the specification means, and delivery means for delivering the structured document generated by the generation means to the application program; and a document receiving device which receives the structured document delivered from the document delivery device.

* * * * *